(No Model.)

J. ALLAN.
WAGON SPRING AND GEARING.

No. 304,484. Patented Sept. 2, 1884.

WITNESSES:
O. F. McArdle,
C. Sedgwick

INVENTOR:
J. Allan
BY Munn & Co.
ATTORNEYS.

UNITED STATES PATENT OFFICE.

JOSEPH ALLAN, OF CARROLLTON, MISSISSIPPI.

WAGON SPRING AND GEARING.

SPECIFICATION forming part of Letters Patent No. 304,484, dated September 2, 1884.

Application filed May 28, 1884. (No model.)

*To all whom it may concern:*

Be it known that I, JOSEPH ALLAN, of Carrollton, in the county of Carroll, Mississippi, have invented a new and useful Improvement in Wagon Springs and Gearing, of which the following is a full, clear, and exact description.

My invention consists in a novel construction and arrangement of main and auxiliary springs in wagons, and combined therewith in a fifth-wheel, that relieves strain on the king-bolt, as hereinafter described and claimed.

Reference is to be had to the accompanying drawings, forming part of this specification, in which similar letters of reference indicate corresponding parts in both figures.

Figure 1:
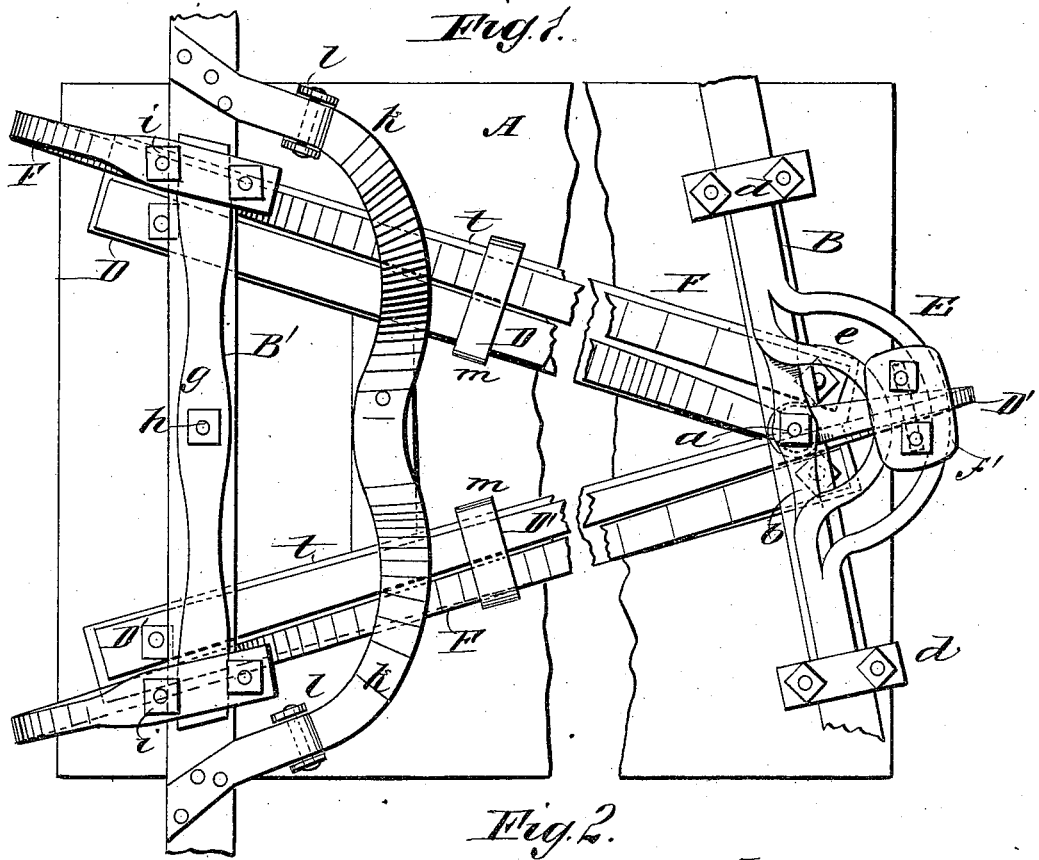
Figure 2:
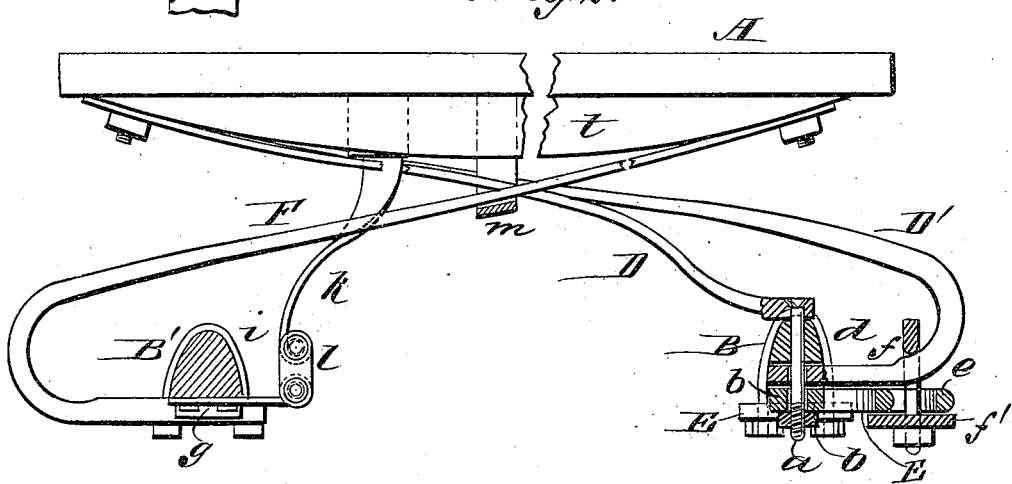

Figure 1 is an inverted plan view of a wagon body and axles with my springs and gearing, and Fig. 2 is a sectional side view of the same.

A is the body or platform of the wagon. B is the forward and B' the rear axle. The forward axle, B, is sustained at the forward ends of the bar-springs D D', that are attached at the back end of the platform A, and extend forward diagonally toward the center, the spring D terminating with an eye for the king-bolt $a$, while the spring D' curves over and beneath the forward axle and has an eye for the king-bolt. A lateral brace, $b$, receives the lower end of the bolt $a$, and is attached to the axle by clips $d$ at its ends. The fifth-wheel E is a brace of semicircular form, having ends bent to pass beneath the clips $d$, and formed with a slot, $e$, that receives a shackle, $f$, connecting the forward end of spring D' with the fifth-wheel. The brace or fifth-wheel E bears on the under side of spring D', and the plate $f'$ of the shackle covers the under side of the slot, so as to form a wide surface over which the fifth-wheel slides easily. This construction relieves the king-bolt almost entirely of strains. The rear axle is attached by clips $i$ upon the forwardly-curved ends of diagonal spring-bars F, which are attached to the forward part of the platform A. Both pairs of springs D D' and F F taper in thickness at their ends connected to the platform, so that the elasticity is principally at those ends, and in order to equalize the pressure and transfer the strain toward the thicker ends there are curved blocks $t$ attached to the platform over the springs. These serve to sustain the springs more or less as the weight varies. At the under side of axle B' is a bar, $g$, attached by a bolt, $h$, in the middle, and having its ends secured beneath springs F by the clips $i$, and the ends are bent down against the springs to prevent them from slipping out on the axle. As an auxiliary spring, and to prevent side motion of the platform, a curved spring-brace, $k$, is applied to the rear axle. This is attached at its mid-length to platform A, at a point forward of the axle, and its ends, curving downward and backward, are attached to the axle B' by shackles $l$, so that while this brace $k$ prevents side movement of the platform it allows the free up-and-down movement with the springs, besides furnishing additional spring-support to the rear of the wagon. Staples $m$ prevent rise of the wagon-body too far. This construction gives substantial and durable spring-gearing for wagons of comparatively inexpensive character, and that can be readily repaired.

These springs can be applied to any kind of vehicle.

Having thus described my invention, I claim as new and desire to secure by Letters Patent—

1. The spring-gearing for wagons, consisting of the diagonal bar-springs D D' F F, attached at front and rear of the body and to the axles, substantially as described.

2. The combination of the springs D D', king-bolt $a$, axle B, and wagon platform or body A, substantially as shown and described.

3. The combination of the slotted brace or fifth-wheel E, forward axle, B, bolt $a$, shackle $f$, and springs D D', connected to the rear part of the wagon-body, substantially as described.

4. The combination, with wagon-body A and rear axle, B', of the diagonal bar-springs F, attached to the forward end of the wagon and curved at their rear ends to receive the axle, substantially as described.

5. The bar $g$ and axle-clips $i$, combined with axle B' and springs D', substantially as and for the purpose specified.

6. The combination of the spring-brace $k$ and shackles $l$ with the axle B', springs F, and platform A, substantially as described.

7. The curved blocks $t$, combined with wagon body or platform A, and springs D D' F F, substantially as and for the purpose specified.

JOSEPH ALLAN.

Witnesses:
T. T. HAMILTON,
H. W. PATTY.